March 24, 1953   O. C. RICHARDSON   2,632,275
TONG FISHING HOOK ASSEMBLY
Filed March 17, 1950
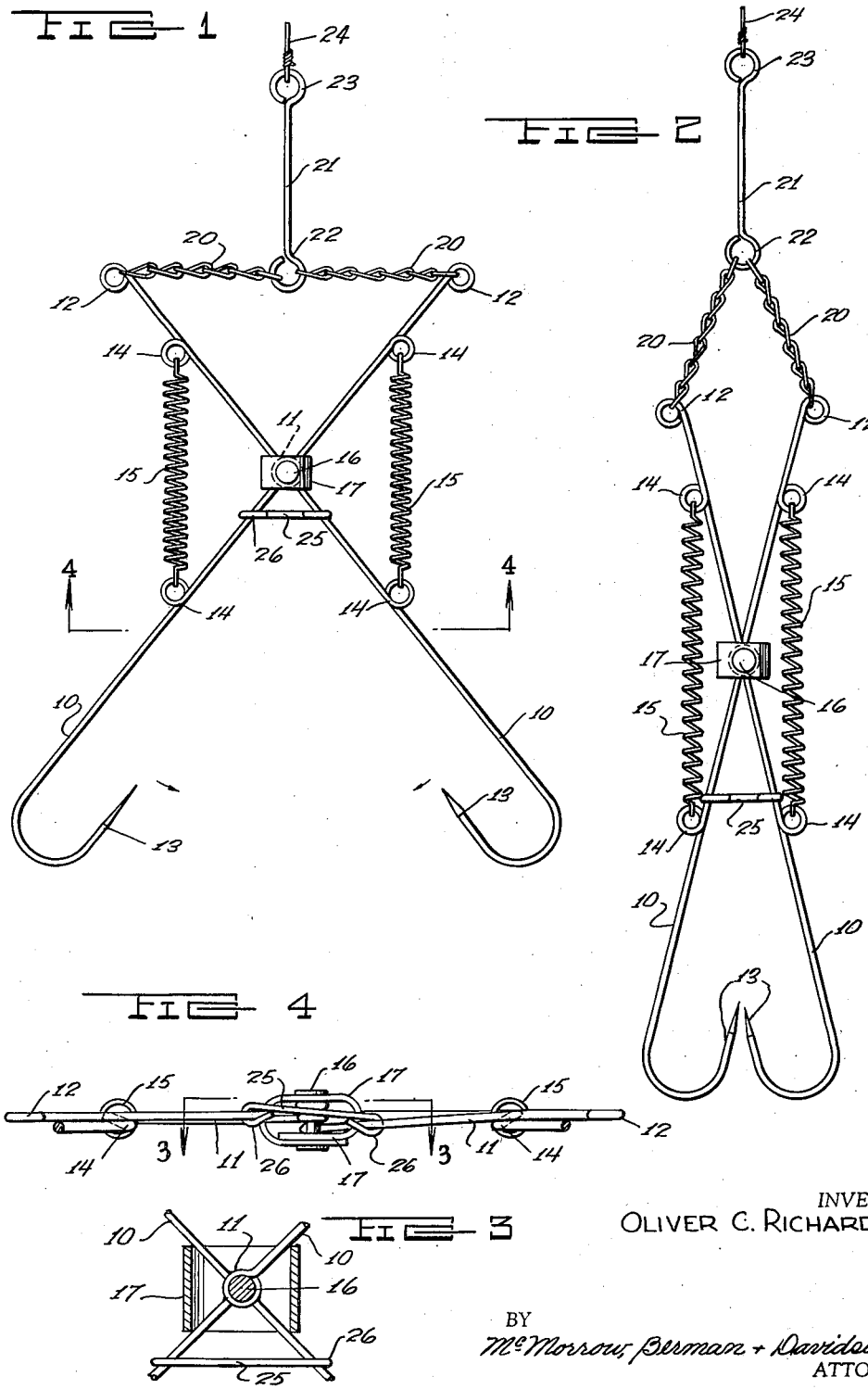
INVENTOR
OLIVER C. RICHARDSON
BY
McMorrow, Berman + Davidson
ATTORNEYS Patented Mar. 24, 1953

2,632,275

UNITED STATES PATENT OFFICE 2,632,275

TONG FISHING HOOK ASSEMBLY

Oliver C. Richardson, Detroit, Mich.

Application March 17, 1950, Serial No. 150,155

1 Claim. (Cl. 43—37)

This invention relates to fishing equipment, and more particularly to hooks and those of the fast-acting and double-hooking type.

There are a number of hooks, known as gaff hooks, that employ a dual set of hooks operable by the fish itself while trying to disengage himself therefrom or by the pulling of the line by the fisherman or sportsman. They are such that they require the use of prongs or barbs on the hooks to retain the fish thereon, and the hook structure is such that it requires a somewhat complicated bending and interlocking of wire portions of the hook to make it function under the principles used. These structures are so twisted that they are subject to entanglements with the main trolling line and their mechanisms to bind on themselves during use because of the facility in which the parts can be distorted in use. In this invention, a hook assembly is provided that has parts exceptionally straight and simple for a device of this nature, and which operates effectively without danger of entanglements. It is also provided with springs on its hooks to keep the assembly normally open, while including a lock to hold them together when they hook the fish that makes it practically impossible for him to escape.

It is, therefore, an object of this invention to provide a new and improved dual fishing hook assembly that will avoid one or more of the disadvantages and limitations of the prior art.

Another object of the invention is to provide a new and improved fishing hook of the gaff type with dual hooks that will remain open during normal use while fishing, but will close securely on a fish when the latter is hooked thereon and tries to pull away.

An additional object of the hereindescribed invention is to provide a new and improved dual gaff hook assembly without barbs on its hooks and which automatically closes on a fish caught as a pull is impressed on the attachment securing it to the main fishing line that trolls it.

Additional objects and advantages will be evident as this description is outlined in more detail.

For a better understanding of the invention and the principles thereof, reference is made to the accompanying drawings which illustrate a particular form of the invention by way of example that is explained in the following description, while the legal scope of the invention is outlined in the claim.

Referring to the drawings:

Figure 1 is an elevation view of a gaff embodying this invention, its hooks being in open position assumed during the normal process of fishing;

Figure 2 is a similar view of the device in closed position;

Figure 3 is a sectional view in plan taken along line 3—3 of Figure 4; and

Figure 4 is an under-side view of Figure 1, taken on line 4—4 thereof.

Similar reference characters refer to the same parts throughout the drawings.

The drawings illustrate a gaff hook assembly that includes two similar hook shanks 10. These have straight shanks 10 each provided with a loop 11 twisted in at about one-third of its length from the small eyelets 12 formed on its free end, as indicated in Figures 1 and 2. The hooks 13 are formed at the other ends of the shanks 10 and are without barbs and bent into a regular U contour. Two other laterally outwardly offset eyelets 14 are formed on each of the shanks 10 and are equally spaced on both sides of the eyelets 11. The eyelets 14 hold the looped ends of a pair of coil springs 15 which tend to bias the shanks 10 to an open or an ✕ relation. In this position, the legs of the pivoted shanks are spaced apart. The pin 16 extends through a bent-over ring 17 which holds the shanks together in an ✕-like manner at the eyelets 11 and enables them to pivot thereon. A pair of equal short chains 20 holds the eyelets 12 from spreading too far when the hook portions are opened full, as shown in Figure 1, the angle of full opening being approximately 85°. These chains 20 are in common joined to the loop 22 of a link 21 which is about as long as one of the chains 20 and bent with another loop 23 at its other end. This loop 23 is adapted for attachment to a fishing line 24 that pulls the hook assembly through the water during fishing.

A slidable locking link 25 encompasses the so-called lower and longer legs of the shanks 10 with a loop 26 at each end, individually, ample enough to allow a free movement thereon. When the shanks 10 are brought together from the open ✕ outline, see Figure 1, to the closed form shown in Figure 2, the element 25 slips down, as shown, and is eventually stopped by the eyelets 14. This last position is assumed by the assembly when a fish pulls on the hooks and shanks and is taunt enough to stretch the springs 15 and dispose the chains 20 as indicated in Figure 2. When the fish is removed, the springs 15 return the shanks into the normal position shown in Figure 1. The element 25 is adjustable in its position on the shank by the amount of spreading apart required by the hooked fish.

The action of the assembly is interesting in that it is normally open wide with the hooks 13 in an engageable position and will retain this position until an appreciable pull is placed on them. When the fish attaches himself to either hook, he pulls thereon and in doing so forces the other hook 13 into his body. This makes him secure, and as the shanks 10 are brought together, the element 25 slips down and locks the hooks 13 so that the fish is more firmly attached. The clasp 17 being flat tends to keep the assembly flat and reduce any tendency to rotate in the water during trolling, which feature is also cooperated in by the eyes 12 and 14 extending laterally from the shanks, as well as by the obstruction thereto offered by the springs 15. The hooks by their U-shaped contour and the effect of the element 25 do not need the barbs commonly included. The shorter and upper legs of the shanks are those on which the pressure is exerted during a "catch." When the shanks are open, the chains are made taut, and when closed, are collapsed.

While barbs are not considered desirable in this form of the invention, there are occasions where such may be desirable. In other instances, the use of real bait may be preferred by the sportsman and he may attach same to the hook described in any convenient and suitable manner.

While but one form of the invention has been illustrated and described, it is not desired to limit the application for patent to this specific form, as it is appreciated that other constructions could be developed and made that would employ the same principles and come within the scope of the appended claim.

Having thus described the invention, what is claimed is:

In a fishing hook assembly, a pair of straight shanks, said shanks being crossed at a point intermediate their ends, means pivoting the shanks together, said shanks having laterally inwardly directed hooks at one end, eyelets on the other ends of the shanks, a flexible element extending between and connected to the eyelets, a fishing line being adapted to be connected to a midpoint of the flexible element, eyes on the shanks at points between the point of intersection of the shanks and the eyelets and between the point of intersection and the hooks, springs stretched between and connected to the eyes at opposite sides of said pivot means, and a link extending between the shanks at the side of said pivot means remote from said flexible element, said link having loops slidably engaged in the shanks, said loops being spaced from each other to hold the shanks in a closed relation to each other against the tension of the springs, said pivot means comprising a ring circumposed on the shanks at their point of crossing, and a pivot pin extending across and through the ring and traversing the shanks at their point of crossing, said ring being of a diameter to limit opening movement of the shanks away from each other.

OLIVER C. RICHARDSON.

REFERENCES CITED

The following references are of record in the file of this patent:

UNITED STATES PATENTS

| Number | Name | Date |
|---|---|---|
| 270,482 | Raymond | Jan. 9, 1883 |
| 541,842 | Finley | July 2, 1895 |
| 1,128,277 | Adler | Feb. 16, 1915 |
| 1,261,065 | Smend et al. | Apr. 2, 1918 |
| 1,488,838 | Savoie | Apr. 1, 1924 |
| 2,016,356 | Alberg | Oct. 8, 1935 |
| 2,383,073 | Oden et al. | Aug. 21, 1945 |

FOREIGN PATENTS

| Number | Country | Date |
|---|---|---|
| 365,477 | Italy | Dec. 5, 1938 |